Figure 1:
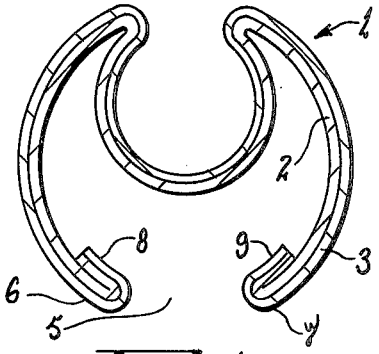
Figure 2:
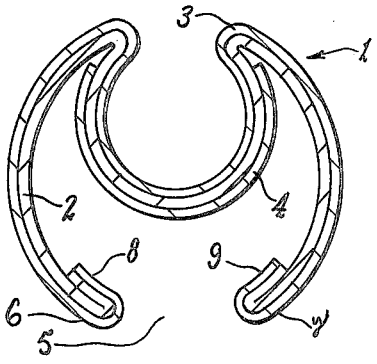
Figure 3:
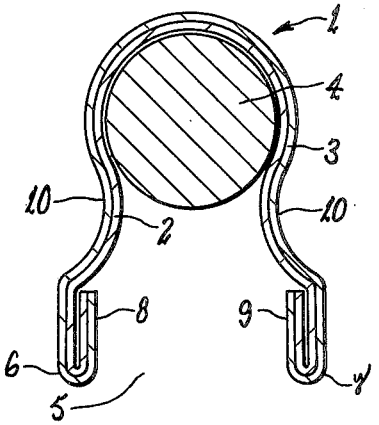
Figure 4:
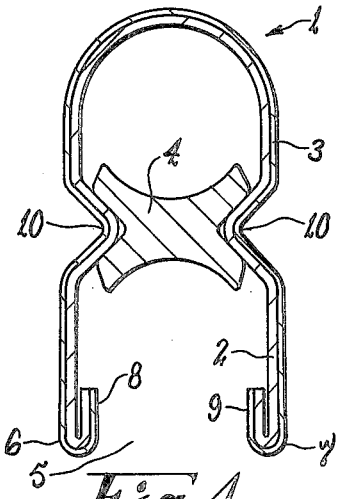
Figure 5:
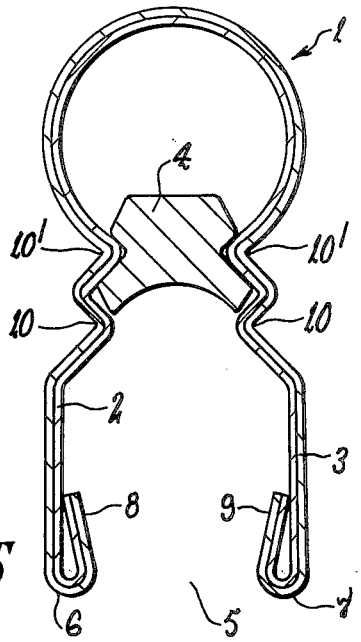
Figure 6:
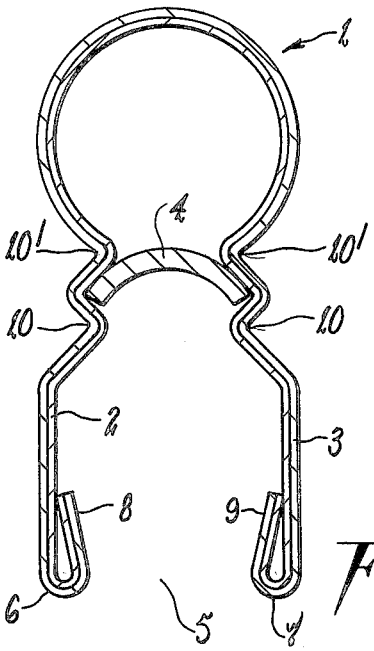

United States Defensive Publication [19] (H) [11] T973,010

McDonald [43] Aug. 1, 1978

[54] ELECTRICAL CONDUCTOR SYSTEMS

[76] Inventor: Kenneth Herbert McDonald, 6 Wallabah St., Mount Waverley 3149 Victoria, Australia

[21] Appl. No.: 613,881

[22] Filed: Sep. 9, 1975

[51] Int. Cl.[2] ..... B60M 1/12

[52] U.S. Cl. ..... 191/23 A; 191/22 R

[57] ABSTRACT

An electrical conductor system to supply power to a travelling collector comprises an elongated hollow conduit formed with a continuous longitudinally extending slot. An insulating layer is bonded to the outer surface of the conduit and the conduit may be used as the sole current carrier. A continuous elongated conductor may be held in electrical contact with the inner surface and supported by discrete lengths of conduit in a position where the conductor is adapted to be contacted by a brush extending through the slot.

8 Claims, 1 Sheet Drawing,

10 Pages Specification

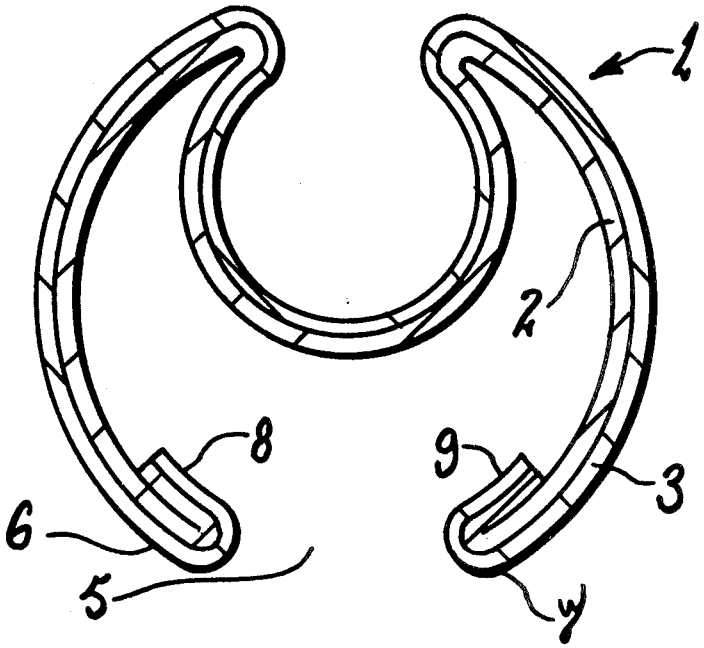

The file of this unexamined application may be inspected and copies thereof may be purchased (849 O.G. 1221, Apr. 9, 1968).